United States Patent
Yamamoto et al.

(10) Patent No.: US 7,777,733 B2
(45) Date of Patent: Aug. 17, 2010

(54) TOUCH PANEL AND MANUFACTURING METHOD THEREOF

(75) Inventors: Yasutaka Yamamoto, Osaka (JP); Hirofumi Komiya, Osaka (JP)

(73) Assignee: Panasonic Corporation, Osaka (JP)

( * ) Notice: Subject to any disclaimer, the term of this patent is extended or adjusted under 35 U.S.C. 154(b) by 692 days.

(21) Appl. No.: 11/734,291

(22) Filed: Apr. 12, 2007

(65) Prior Publication Data

US 2007/0249107 A1     Oct. 25, 2007

(30) Foreign Application Priority Data

Apr. 19, 2006   (JP)   ............... 2006-115188

(51) Int. Cl.
*G09G 5/00*   (2006.01)
(52) U.S. Cl. ...................... 345/173; 438/155
(58) Field of Classification Search ................ 345/173; 438/155
See application file for complete search history.

(56) References Cited

U.S. PATENT DOCUMENTS

2004/0051699 A1   3/2004   Tanabe et al.
2005/0078094 A1 *  4/2005  Fujii et al. ................ 345/173

FOREIGN PATENT DOCUMENTS

| CN | 1465005(A)   | 12/2003 |
|----|--------------|---------|
| JP | 2003-058319  | 2/2003  |

\* cited by examiner

*Primary Examiner*—Amare Mengistu
*Assistant Examiner*—Jennifer Zubajlo
(74) *Attorney, Agent, or Firm*—RatnerPrestia

(57) ABSTRACT

Proving a touch panel having a superior transparent visibility, easy to manufacture and of low cost, to be used for various electronic devices. In manufacturing, forming a notch with an adhesive layer formed on an undersurface of an under substrate, under a connecting portion of the under substrate with a wiring substrate. After applying rollers for short a period of time for almost completely removing bubbles between the under substrate and the adhesive layer, adhering such under substrate to an upper substrate. Finally heating and pressing the connecting portion, connecting the wiring substrate to the substrates, obtaining the touch panel having a superior transparent visibility, easy to manufacture and of low cost.

3 Claims, 4 Drawing Sheets

TOUCH PANEL AND MANUFACTURING METHOD THEREOF

FIELD OF THE INVENTION

This invention relates to a touch panel to be mainly used for operating various electronic devices, and a manufacturing method thereof.

BACKGROUND OF THE INVENTION

In recent years, an electronic device including a portable phone and a car navigator tends to require much higher and a variety of functions. With this trend, a device having an optically transparent touch panel placed on front side of a liquid crystal element or other display element is increasing in number, in which the variety of functions is switched with the touch panel pressed by a finger or a pen, while a display of the display element is visually recognized in a rear side of the panel. In this circumstance, a touch panel having a superior transparent visibility and a secure operability is demanded.

A conventional touch panel of this type and its manufacturing method is explained hereinafter using FIGS. 3 and 4.

For easy understanding, thickness of constituent component is shown enlarged in the drawings.

FIG. 3 is a cross sectional view of a conventional touch panel; and FIG. 4 is an exploded perspective view of the same.

In the drawings, upper conductive layer 3 an optically transparent material made of indium tin oxide, tin oxide or the like is formed on an undersurface of upper conductive layer 1 an optically transparent and film-like material. Similarly, under conductive layer 4 an optically transparent material is formed on an upper surface of under-substrate 2 an optically transparent film-like material.

On an upper surface of under conductive layer 4, a plurality of dot spacers made of insulating resin is formed at predetermined intervals (not illustrated). In this structure, a pair of upper electrodes 3A made of silver or the like is formed with upper electrode 3, and a pair of under electrodes 4A is formed with under conductive layer 4 crossing upper electrodes 3A at right angles.

Spacer 5 is formed in a frame shape on a peripheral part of the undersurface of upper substrate 1 or on the upper surface of under substrate 2, attaching the peripheral parts of upper substrate 1 and under substrate 2 with an adhesive layer (not illustrated) applied to an upper and a lower surface of spacer 5, facing upper conductive layer 3 and under conductive layer 4 each other at a predetermined space.

Further, a plurality of wiring patterns 6A and 6B made of copper, silver or the like is formed on an upper and lower surface of film-like wiring pattern 6, and then an insulating layer (not illustrated) is formed on the upper and the lower surfaces of wiring pattern 6 except for its end portions, covering wiring patterns 6A and 6B.

A left end portion of wiring pattern 6 (left end in FIG. 3, hereinafter called "left end") is held between a right end portion (right end in FIG. 3, hereinafter "right end") of upper substrate 1 and under substrate 2, and a terminal portion of upper electrode 3A formed on the undersurface of upper substrate 1 and a terminal portion of under electrode 4A formed on the upper surface of under electrode 2 are attached to the left ends of wiring pattern 6A and 6B, with anisotropic conductive adhesive 7, a synthetic resin dispersed with conductive particles.

Still further, adhesive layer 8 is formed on an entire undersurface of under substrate 2, covered by removable sheet 9, thus constituting the touch panel.

Thus constituted touch panel, after removable sheet 9 being removed, is attached to a front side of liquid crystal or other display element with adhesive layer 8 formed on the undersurface of under substrate 2, and then which is installed on an electronic device. When installing, wiring pattern 6 is bent downward and the right end of wiring patterns 6A and 6B is connected to an electronic circuit (not shown) of the device by a connector or by soldering.

With this structure, when a finger or pen pressure is applied to an upper surface of upper substrate 1, upper substrate 1 is bent at the depressed point, contacting upper electrode 3 with under electrode 4 at the depressed point, while a display of the liquid crystal element is seen and recognized in a rear side of the touch panel.

Voltage is sequentially applied from the electronic circuit, through the plurality of wiring pattern 6A and 6B, to upper electrode 3A and under electrode 4A, then to upper conductive layer 3A and under electrode 4A crossing the upper electrodes at right angles. The electronic circuit detects the depressed point with an applied voltage ratio, switching the various functions of the device.

When manufacturing this type of touch panel, first adhering an identical size of upper substrate 1 and under substrate 2 with spacer 5, holding the left end of wiring substrate 6 between upper electrodes 3A and 4A which are extensively formed at the right end of upper substrate 1 and under substrate 2, by positioning so as the plurality of wiring patterns 6A and 6B be put on the plurality of upper electrodes 3A and under electrodes 4A.

Next, heating and pressing the upper surface of upper substrate 1 and the lower surface of under substrate 2 by a jig and tool while the substrates holding the left end of wiring substrate 6 between the two, for adhesively connecting the terminal portion of upper electrode 3A and under electrode 4A to the left end of wiring patterns 6A and 6B with anisotropic conductive adhesive 7, therewith connecting wiring substrate 6 to upper substrate 1 and under substrate 2.

Then, adhering adhesive layer 8 of which the underside being covered by removable sheet 9 to the undersurface of under substrate 2 by successively applying rollers from an end portion of such adhered substrate in such a way that a bubble is not taken in when rolling, completing a touch panel connected by wiring substrate 6.

Manufacturing of the touch panel is possible by a conversely arranged process too. In this case, first adhering adhesive layer 8 and removable sheet 9 to the undersurface of under substrate 2 on which under conductive layer 4 being formed, then applying rollers to such stack, adhering the stack to upper substrate 1 through spacer 5, and then finally heating and pressing the upper surface of upper substrate 1 and the undersurface of removable sheet 9, connecting wiring substrate 6 to upper substrate 1 and under substrate 2.

However, when manufacturing the panel in this order, adhesive layer 8 is also heated and pressed when the connecting portion between the substrates and wiring substrate 6 is heated and pressed, with a possibility that adhesive layer 8 is deformed at the connecting portion or adhesive power of adhesive layer is deteriorated.

Because of the reason, in a conventional manufacturing method, connecting wiring substrate 6 first by heating and pressing the connecting portion, and then adhering adhesive layer 8 and removable sheet 9 to the undersurface of under substrate 2. With this process, however, bubbles can be taken in between the undersurface of under substrate 2 and adhesive layer 8, sacrificing transparent visibility of the panel when it is attached to a liquid crystal or other display element peeling off removable sheet 9.

In order to prevent the bubble to be taken in, applying rollers successively from the end for considerably a long period of time to attach adhesive layer 8 to under substrate 2, so it is a time-consuming process.

As a prior art document relating the technology, Unexamined Japanese Patent Publication No. 2003-58319 is publicly known, for an example.

With above conventional touch panel, in order to obtain a touch panel without bubbles but a panel having a good transparent visibility, it becomes necessary to apply rollers successively from one end for a long period of time and prevent bubbles to be rolled in, thereby the manufacturing process becomes a time-consuming and of a high cost, leaving problems.

SUMMARY OF THE INVENTION

This invention is to solve above mentioned problems, and provide a touch panel having a superior transparent visibility, easy to manufacture and of low cost, and a manufacturing method thereof.

In order to solve above problem, the touch panel of the invention has an adhesive layer having a notch formed on an undersurface of an under substrate, the notch formed under a connecting portion between the under substrate and a wiring substrate. In manufacturing such panel, first forming the notch with the adhesive layer formed on the undersurface of the under substrate, under the connecting portion between the under substrate and the wiring substrate. Next, applying rollers thereto, removing bubbles almost completely in a short period of time. Then, adhering such stack to an upper substrate. Finally heating and pressing the connecting portion of the adhesively stacked unit, attaching the wiring substrate. With this arrangement, a touch panel having a superior transparent visibility, easy to manufacture and of low cost, and a manufacturing method of the panel are provided.

BRIEF DESCRIPTION OF DRRAWINGS

DETAILED DESCRIPTION OF THE EXEMPLARY EMBODIMENTS

Following, an exemplary embodiment of the invention is explained with reference to FIGS. 1 and 2. For easy understanding of its constitution, thickness of constituent components is shown enlarged in the figures.

For a part already explained in the background of the invention, the same numerical number is assigned, and detailed explanation of the part is omitted.

Exemplary Embodiment

Figure 1:
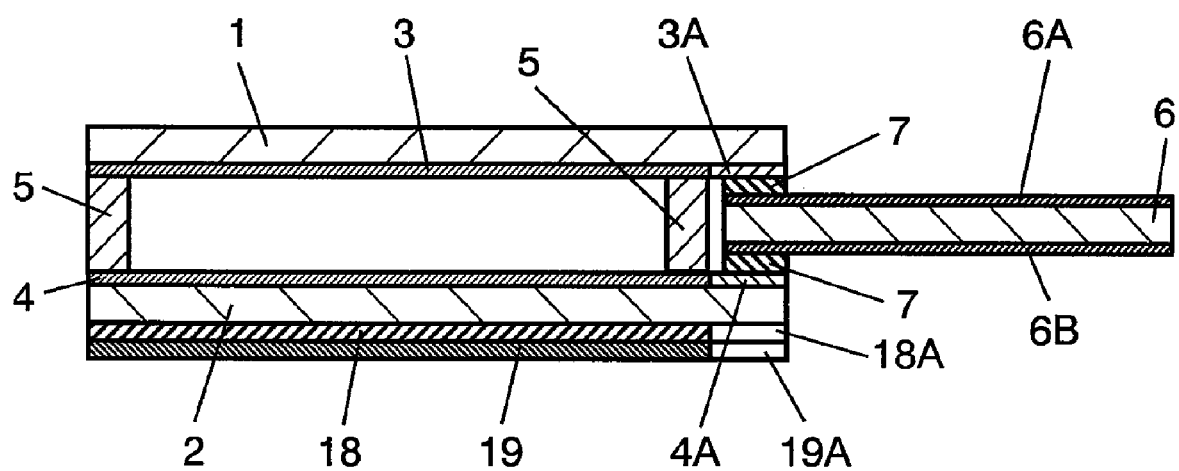
FIG. 1 is a cross sectional view of a touch panel according to an exemplary embodiment of the invention.
Figure 2:
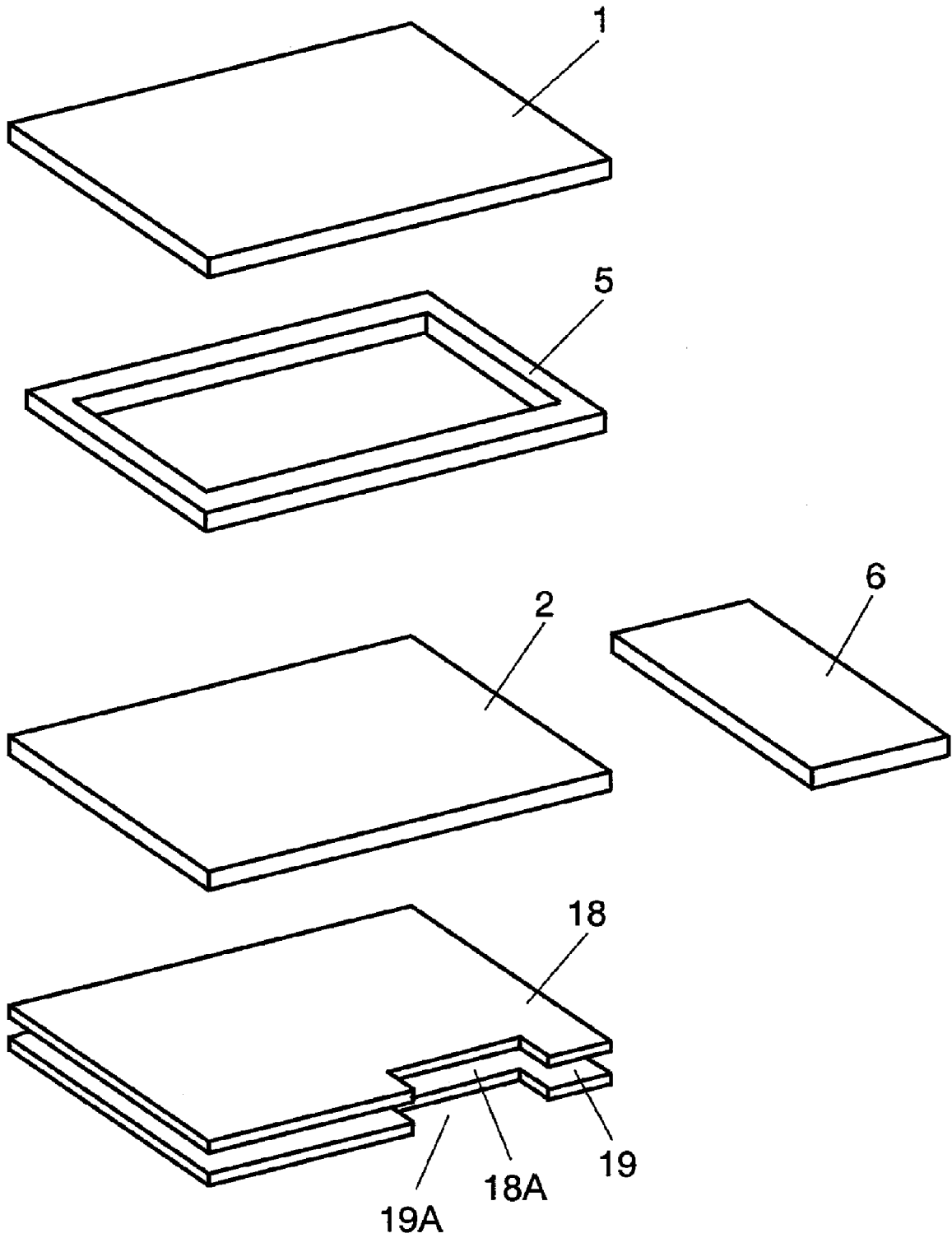
FIG. 2 is an exploded perspective view of the same.
Figure 3:
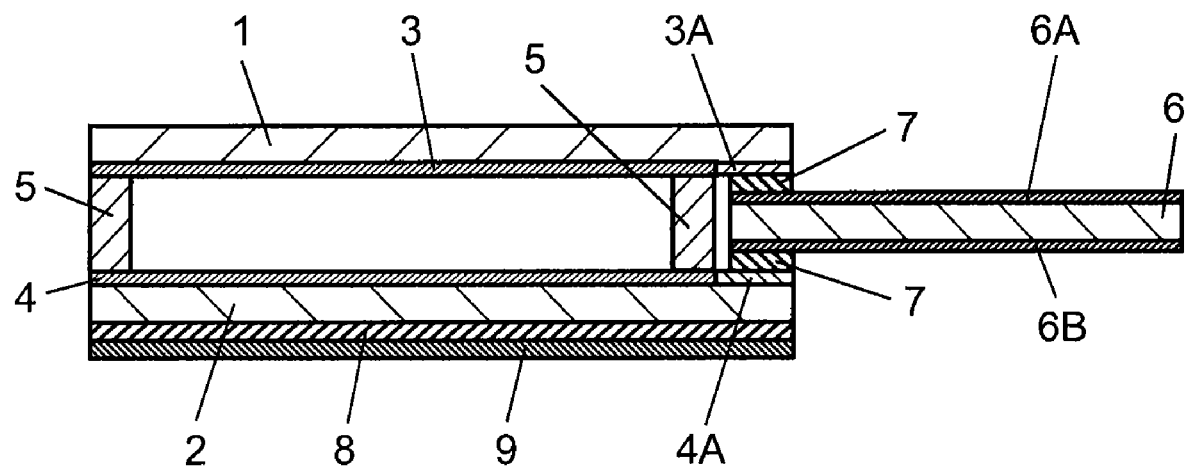
FIG. 3 is a cross perspective view of a conventional touch panel.
Figure 4:
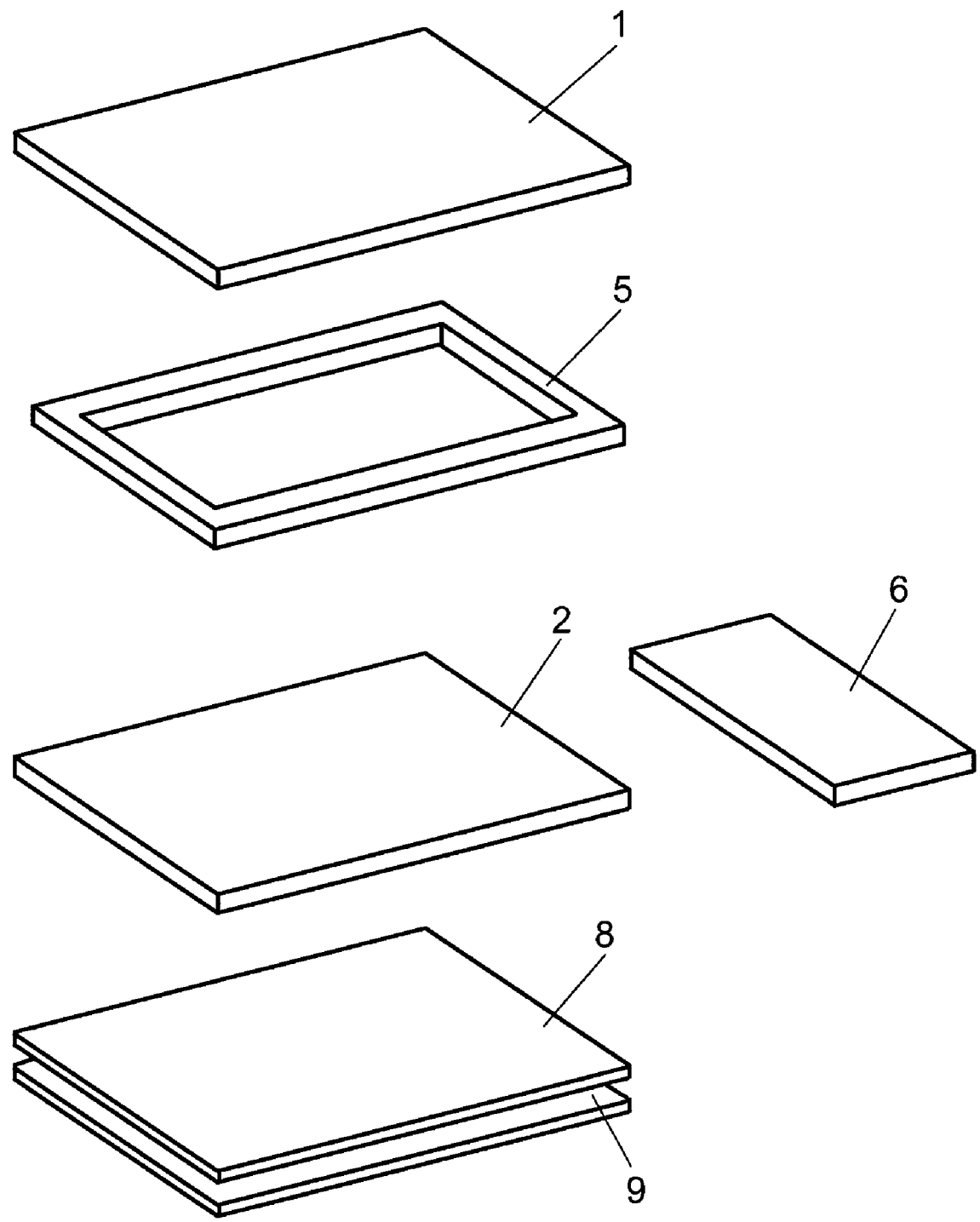
FIG. 4 is an exploded perspective view of the same.

FIG. 1 is a cross sectional view of the touch panel according to an exemplary embodiment of the invention, and FIG. 2 is an exploded perspective view of the same. In the figures, upper conductive layer 3 an optically transparent material made of indium tine oxide, tin oxide or the like is formed on an undersurface of upper conductive layer 1 which is an optically transparent material made of polyethylene terephthalate, polycarbonate or the like by sputtering method, for instance. Similarly, under conductive layer 4 identical material with the upper conductive layer is formed on an upper surface of under substrate 2 which is an optically transparent material made of glass, acryl, polycarbonate or the like by sputtering method, for instance.

On an upper surface of under conductive layer 4, a plurality of dot spacers (not illustrated) made of insulating resin such as epoxy and silicone is formed at predetermined intervals. Upper conductive layer 3 has upper electrodes 3A made of silver or carbon, and under conductive layer 4 has under electrodes 4A crossing upper electrodes 3A at right angles.

On one of outer peripheral part of the undersurface of upper substrate 1 and the upper surface of under substrate 2, spacer 5 is formed in a frame shape with polyester, epoxy or the like. The outer peripheral part of upper substrate 1 and under substrate 2 are adhered by the spacer with an adhesive agent of acryl, rubber or the like (not illustrated) applied to an upper and a lower surface of spacer 5 or one of the surfaces of the spacer, facing upper conductive layer 3 and under conductive layer 4 at a predetermined space.

Further, on an upper and a lower sides of wiring substrate 6 a film-like material made of polyethylene terephthalate, polyamide or the like, a plurality of wiring patterns 6A and 6B made of silver, carbon, copper or the like is formed. An insulating layer (not illustrated) is then formed on both upper and lower sides of wiring substrate 6, covering wiring patters 6A and 6B except for its end portions.

A left end portion of wiring pattern 6A and 6B (left end in FIG. 1, hereinafter called "left end") of wiring substrate 6 is attached to a terminal portion of upper electrode 3A and lower electrode 4A each extensively formed on the undersurface of upper substrate 1 and the upper surface of under substrate 2, being adhered with anisotropic conductive adhesive 7, a synthetic resin of epoxy, acryl, polyester or the like dispersed with a plurality of gold-plated particles of nickel or resin. A plurality of wiring patterns 6A and of 6B is thereby electrically connected, through upper electrode 3A and under electrode 4A, to upper electrodes 3A and then to under electrodes 4A crossing the upper conductive layer at right angles.

Further, adhesive layer 18 made of acryl, silicone, urethane or the like is formed on an undersurface of under substrate 2, covered by removable sheet 19 made of paper, polyethylene terephthalate or the like. In this structure, notch 18A and 19A slightly wider than wiring substrate 6 is formed with adhesive layer 18 and removable sheet 19, under a connecting portion between the under substrate and wiring substrate 6, constituting the touch panel.

When manufacturing the touch panel of this structure, first attach adhesive layer 18 and removable sheet 19 to the undersurface of under substrate 2 on which under conductive layer 4 is formed. Then, apply rollers to the stacked part, squeezing bubbles out which otherwise could obstruct transparent visibility of the panel when it is attached to a liquid crystal or other display element.

In a state where removable sheet 19 is attached to under substrate 2 with adhesive layer 18, the sheet shape parts are all stacked. So, with a relatively simple mechanism like passing the stack between two cylindrical rollers for short a period of time, the bubbles are almost completely squeezes out.

Next, put upper substrate 1 on under-substrate 2, adhere the substrates through spacer 5, and then put the left end of wiring substrate 6 between a right end (right end in the FIG. 1, hereinafter called "right end") of upper substrate 1 and under substrate 2, so that the plurality of wiring patterns 6A and 6B is positioned overlaying the plurality of upper electrodes 3A and under electrodes 4A, and the left end of wiring substrate 6 are held by the substrates.

Lastly, apply heat and pressure to an upper surface of upper substrate 1 and a lower surface of under substrate 2 with a jig and tool, connecting the terminal portion of upper electrode 3A and lower electrode 4A to the left end of wiring pattern 6A and 6B with anisotropic conductive adhesive 7, thus manufacturing the touch panel with wiring substrate 6 being attached.

At this time, notches 18A and 19A slightly wider than wiring substrate 6 must be formed with adhesive layer 18 and removable sheet 19, under the connecting portion of the under substrate with wiring substrate 6. By using the tool and jig little narrower than notches 18A and 19A, the tool and jig can heat and press directly the lower surface of under substrate 2 as well as the upper surface of the upper surface of upper substrate 1, without touching adhesive layer 18 or removable sheet 19.

That is, when attaching wiring substrate 6, the undersurface of substrate 2 is directly heat-pressed, but not adhesive layer 18, preventing adhesive layer 18 to be deformed or extendedly forced outside the connection portion, or an adhesive power of adhesive layer 18 to be deteriorated.

Moreover, because notches 18A and 19A are formed little wider than wiring substrate 6, even when the jig and tool is slightly off its position at the heating and pressuring process, wiring substrate 6 can be adhesively attached to the upper and the under substrates without adhesive layer 18 being heated and pressed.

After removing removable sheet 19, thus constituted touch panel is disposed in a front side of a liquid crystal or other display element with adhesive layer 18 formed undersurface of under substrate 2, which is then installed in an electronic device. When installed, wiring substrate 6 is bent downward so that the right end of wiring patterns 6A and 6B (right end in FIG. 1, hereinafter "right end") is connected with an electronic circuit (not illustrated) of the device through a connector or by soldering.

With this constitution, when a finger or pen pressure is applied to the upper surface of upper substrate 1, upper substrate 1 is bent, contacting upper conductive layer 3 with under conductive layer 4 at the depressed point, meanwhile a liquid crystal or other display element can be transparently seen and recognized in a rear side of the touch panel.

Voltage is sequentially applied from the electronic circuit, through the plurality of wiring patterns 6A and 6B of wiring substrate 6, to upper electrodes 3A and under electrodes 4A, and then to upper conductive layer 3 and under conductive layer 4 crossing the upper conductive layer at right angles. The electronic circuit detects the depressed point with a voltage ratio of applied voltage, switching various functions of the device.

As mentioned, with the exemplary embodiment of the invention, notch 18A is formed with adhesive layer 18 formed on the undersurface of under substrate 2, under the connecting portion of the under substrate with wiring substrate 6. Thus, first preparing adhesive layer 18 having notch 18A under the connecting portion of the under substrate with wiring substrate 6. Then, applying rollers to such stack for short a period of time for removing bubbles between the under substrate and adhesive layer 18, adhering the stack to upper substrate 1. Lastly, heating and pressing the connecting portion between the substrates and wiring substrate 6, connecting wiring substrate 6. With this manufacturing method, a touch panel having a superior transparent visibility, of easy manufacturing and of low cost is obtained.

In above explanation, upper electrode 3A and under electrode 4A are formed on undersurface of upper substrate 1 and on upper surface of under substrate 2, to which the left end of wiring patterns 6A and 6B formed on the upper and the lower surface of wiring substrate 6 are connected. However, the upper electrode and the under electrode can both be formed on one of upper substrate 1 and under substrate 2, to which the wiring patterns formed on one of the upper and the lower surface of wiring substrate 6 can be connected, still embodying the invention.

Conventionally, adhesive layer 18 and removable sheet 19 are adhered and notch 18A is formed with it, naturally forming notch 19A with removable sheet 19. However, if adhesive layer 18 is formed by printing or the like on under substrate 2, only notch 18A can be formed with adhesive layer 18.

With this invention, the touch panel having a superior transparent visibility, easy to manufacture and of low cost can be obtained, which is useful for operating a variety of electronic devices.

What is claimed is:

1. A touch panel comprising:
   an upper substrate being optically transparent and being formed with an upper conductive layer on an undersurface of the substrate;
   an under substrate being optically transparent and being formed with an under conductive layer formed on an upper surface of the substrate, the under conductive layer facing with the upper conductive layer with a predetermined space:
   a wiring substrate, a plurality of wiring patterns being formed on at least one of an upper surface and a lower surface of the wiring substrate, the wiring pattern being connected with at least one of the upper conductive layer and the under conductive layer; and
   an adhesive layer being formed on an undersurface of the under substrate,
   wherein, a notch is formed as a portion of the adhesive layer corresponding to an under portion of a connecting portion between the under substrate and the wiring substrate.

2. The touch panel of claim 1, wherein the wiring substrate is adhered to the upper and lower substrates using a conductive adhesive.

3. A manufacturing method of a touch panel,
   forming an adhesive layer formed with a notch on an undersurface of an under substrate, an under conductive layer being formed on an upper surface of the under substrate, the notch being formed as a portion corresponding to an under portion of a connecting portion between the under substrate and the wiring substrate;
   removing bubbles between the adhesive layer and the under substrate;
   adhering an upper substrate to the under substrate through a spacer,
   holding the wiring substrate between the upper substrate and the under substrate; and
   pressing where the upper substrate and the under substrate holding the wiring substrate, thereby connecting the wiring substrate to the upper and the under substrates.

* * * * *